Jan. 8, 1963   HANS-KLAUS RUPPERSBERG   3,072,901
DOPPLER FREQUENCY SPEED MEASURING APPARATUS
Filed Oct. 14, 1958                           6 Sheets-Sheet 1
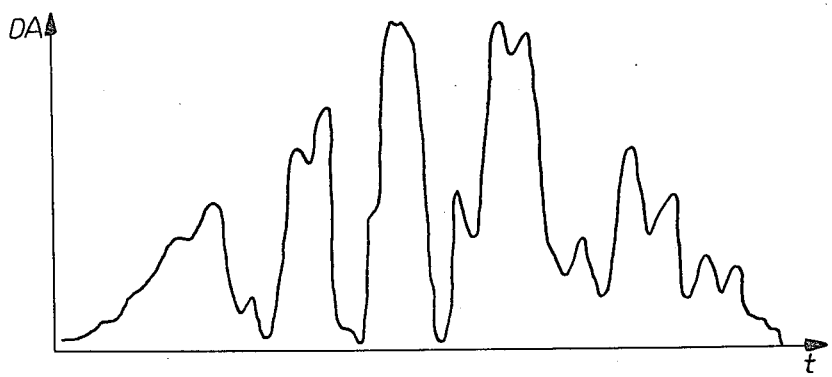
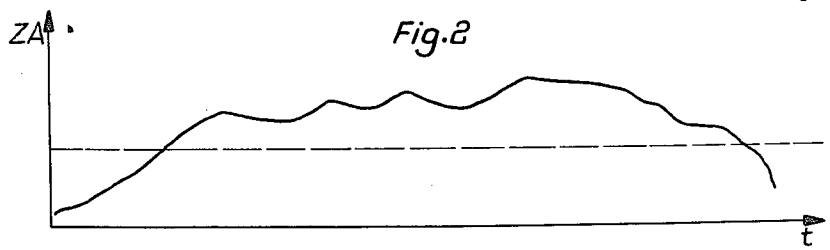
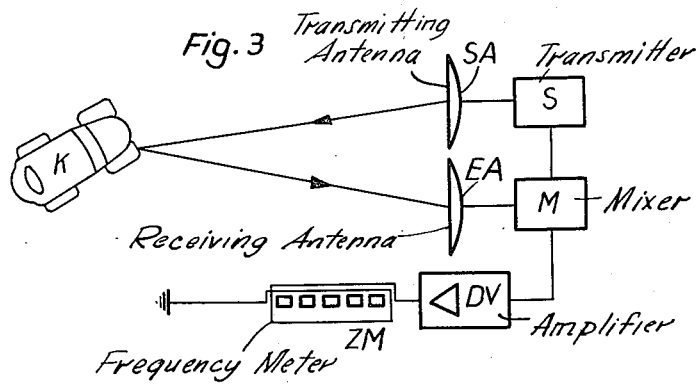
Inventor:
HANS-KLAUS RUPPERSBERG
By
Patent Agent Jan. 8, 1963   HANS-KLAUS RUPPERSBERG   3,072,901
DOPPLER FREQUENCY SPEED MEASURING APPARATUS
Filed Oct. 14, 1958
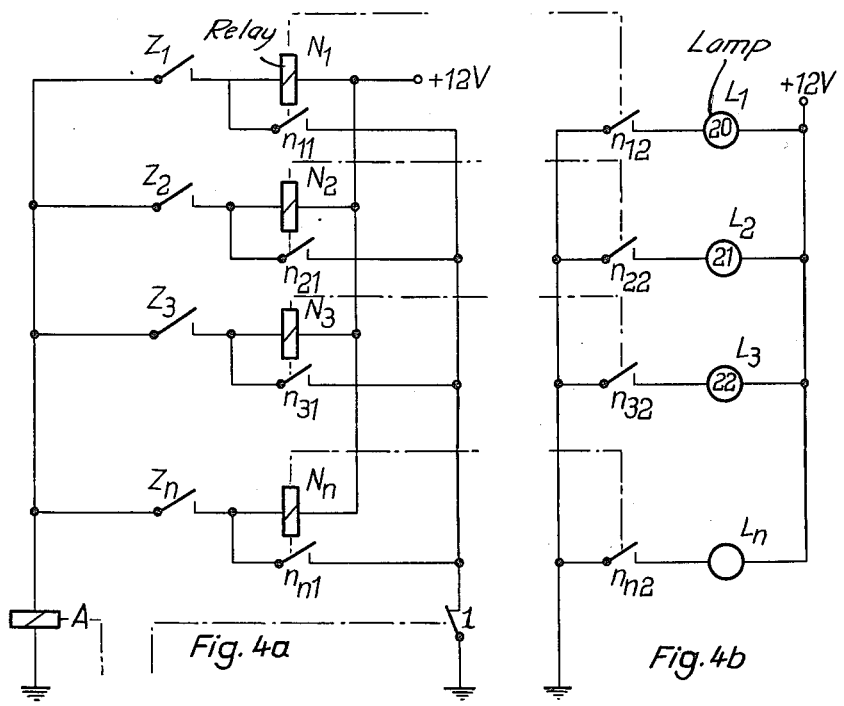
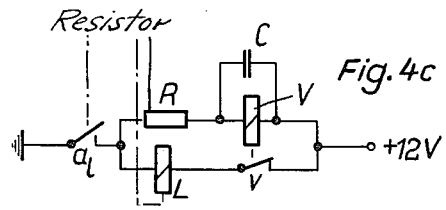
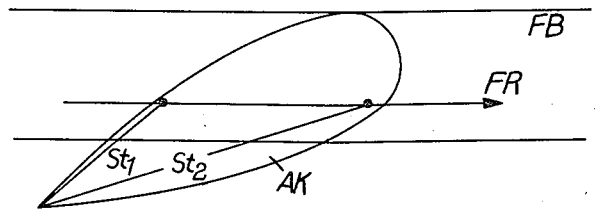
*Inventor:*
HANS-KLAUS RUPPERSBERG

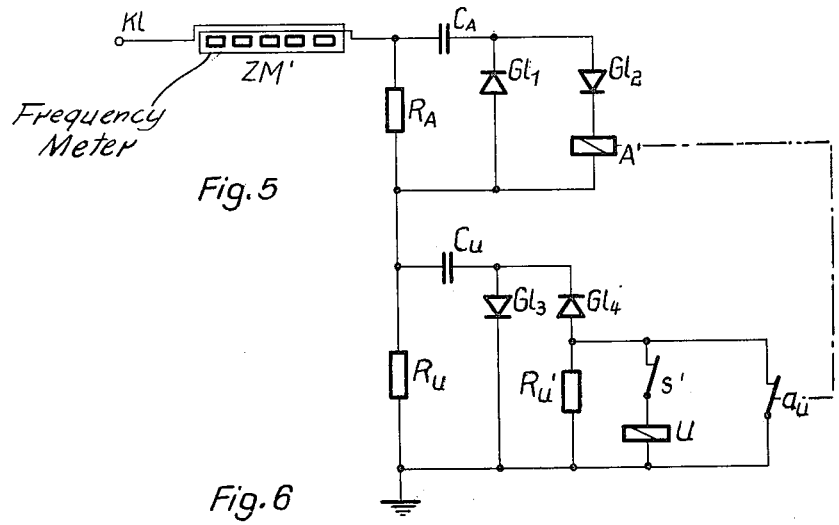

Jan. 8, 1963    HANS-KLAUS RUPPERSBERG    3,072,901
DOPPLER FREQUENCY SPEED MEASURING APPARATUS
Filed Oct. 14, 1958    6 Sheets-Sheet 4

*Inventor:*
HANS-KLAUS RUPPERSBERG
By
*Patent Agent*

United States Patent Office 3,072,901
Patented Jan. 8, 1963

3,072,901
DOPPLER FREQUENCY SPEED MEASURING
APPARATUS
Hans-Klaus Ruppersberg, Ulm (Danube), Germany, assignor to Telefunken G.m.b.H., Berlin, Germany
Filed Oct. 14, 1958, Ser. No. 767,180
Claims priority, application Germany Oct. 25, 1957
25 Claims. (Cl. 343—8)

The present invention relates to Doppler frequency apparatus for measuring and indicating velocities.

It has been known to measure velocities of objects employing Doppler frequency apparatus, wherein these objects are made to radiate or to reflect electromagnetic or sound waves. If the object is moving towards or away from such measuring apparatus, the wave radiated or reflected by the object has its frequency shifted as viewed by the apparatus. The frequency variation is proportional to the object velocity, so that by determining said frequency shift, the velocity of the object can be determined.

Since the passive method according to which the object only reflects the wave is more frequently used than the active method wherein the object emits a locally-generated radiation, the present invention will be described with reference to the passive method. However, it will be appreciated that the invention is also applicable to the active method and that it is concerned particularly with frequency-sensitive indicators measuring the Doppler frequency and, thereby, the speed.

An apparatus for measuring vehicle velocities by means of the Doppler frequency and operated in accordance with the reflecting method is disclosed in "Wireless Engineer," of March 1956, pages 66 to 74. In this known apparatus, a Doppler frequency oscillation is first converted into square pulses of equal amplitude by means of a limiting device and a bistable multivibrator. By differentiation of these square pulses, control pulses with sharp edges are obtained which serve to trigger a monostable multivibrator. This monostable multivibrator produces pulses of equal amplitude and equal duration at a pulse repetition rate corresponding to the Doppler frequency. If such pulse repetitions are applied to a meter indicating the mean current value, an indication is obtained which is proportional to the Doppler frequency.

Due to the inertia of the indicator, a relatively long measuring period is required. When the vehicle passes very rapidly through the antenna pattern of the speed measuring apparatus, the pointer of the indicator may have not sufficient time to reach the actual velocity value. In vehicle velocity measuring apparatus, it is often desired to couple the measuring apparatus with a photographic camera simultaneously taking pictures of the vehicle and of the frequency meter measuring the velocity at which this vehicle travels, so that a single photo shows the license number of the vehicle together with the measured speed. Due to the long time interval between the passage of the vehicle and the speed indication, the vehicle, depending upon its velocity, is either still in the vicinity of, or already far away from the measuring station. Thus, it has not been possible to focus a camera so that it will take pictures of each vehicle. If two or more vehicles are located simultaneously in the field of vision of the camera, the known apparatus may give an erroneous indication which corresponds to approximately the sum of the velocities of these two vehicles. Moreover, tests have proven that the echo signal amplitude fluctuates considerably, especially if the rays impinge on the side of the vehicle.

FIGURE 1 is a graphical illustration of a Doppler frequency amplitude plotted against time for an ordinary speed measuring apparatus.

FIGURE 2 is a graphical illustration of the amplitude of vibration of a reed-type frequency meter plotted against time for speed measurements under similar conditions by an apparatus according to the present invention.

Figure 7:
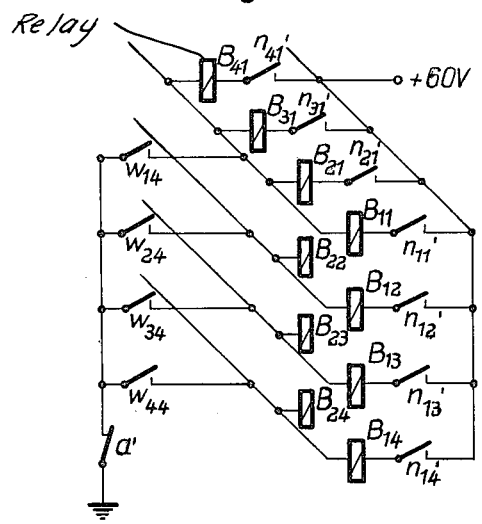

In order to illustrate this effect, the diagram of FIGURE 1 shows the Doppler frequency amplitude DA of a small vehicle, such as a Volkswagen. According to this diagram, the Doppler frequency amplitude can drop to zero, even when the vehicle lies in the antenna pattern. In such ranges, the pointer of the indicator as used in the known apparatus would always fall toward zero, so that the indication obtained will be fluctuating and, therefore, difficult to read. If the fluctuations of the indicator are damped, average indications will be obtained which are too low. It is possible to suppress or at least to reduce interference in the Doppler frequency by positioning the velocity measuring apparatus in such a manner, that the vehicles are scanned at a negligible angle, i.e., are moving substantially directly towards or away from said apparatus. However, such a positioning has the further disadvantage that, when vehicles follow one another closely, only the speed of the first vehicle is indicated, since this first vehicle masks the following vehicles completely. In the known apparatus, erorrs in measurement may also be obtained as a result of changes in the values of the circuit components used to measure the frequency and of fluctuations of the supply voltages. Consequently, the accuracy of velocity measuring apparatus and, more particularly, of vehicle-speed indicators, must frequently be checked by means of a frequency standard. If this is not done, the accuracy of the speed indication may be subject to challenge in court. A further difficulty of the known apparatus, when measuring velocities of vehicles travelling along a road or highway, resides in that, in addition to the velocities of the vehicles travelling in one direction, the velocities of the vehicles travelling in the opposite direction are indicated, so that the photographic record is ambiguous when two vehicles cross one another.

It is an object of the present invention to provide an apparatus for velocity measuring, particularly for road vehicles, operating on the principle of the Doppler frequency, whereby this Doppler frequency and, therefore, the vehicle velocity, are indicated on a reed-type frequency meter.

By the use of such reed-type meter, the disadvantages of the known apparatus are overcome, because reed-type meters arrive at their greatest vibration amplitude after about 60 cycles. Thus, the interval required for a reed-type meter to come full amplitude depends upon the frequency and is inversely proportional to the speed of the object seen by the apparatus according to the invention. Objects travelling at greater velocities and remaining only shortly in the antenna pattern are indicated very rapidly. A plurality of objects simultaneously appearing in the antenna pattern and travelling at different velocities, for example, when overtaking, result in a plurality of Doppler frequencies indicated at the same time, as the reeds of the meter tuned to different Doppler frequencies are excited simultaneously. Even if the velocity measuring apparatus is positioned so that the objects are travelling at a relatively large angle with respect to the direction of the antenna beam, which is capable of producing strong amplitude interferences in the Doppler frequencies, the use of a reed-type meter ensures a satisfactory indication, since such reed-type meters vibrate with a considerable amplitude owing to their mechanical inertia even during interference.

As stated above, the vibration amplitude ZA of a reed excited by a Doppler frequency wave according to FIGURE 1 is plotted against time $t$ in FIGURE 2. Thus, in a relatively simple manner, the velocity measuring apparatus according to the invention is provided with an indicator giving a constant frequency reading of the vehicle velocity until the next vehicle appears. With the use of an additional simple means, it is possible to indicate only the objects travelling in one direction. Such additional means is particularly valuable when the measuring apparatus is used to determine velocities of road vehicles, since it becomes possible to completely exclude indications of the traffic moving in the opposite direction. Since the reeds of a tachometer represent accurate frequencies, the resonant frequency of which is not altered with ageing, the indication of the velocity will not vary and may not easily be challenged in court. The velocity measuring apparatus according to the invention can also be used to obtain traffic records along the roads and highways. By employing a simple additional device, it will be possible to indicate and/or record vehicle velocities and sizes. In contrast to this, the conventional apparatus known heretofore for traffic surveys recorded only the number of vehicles passing by.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 9:
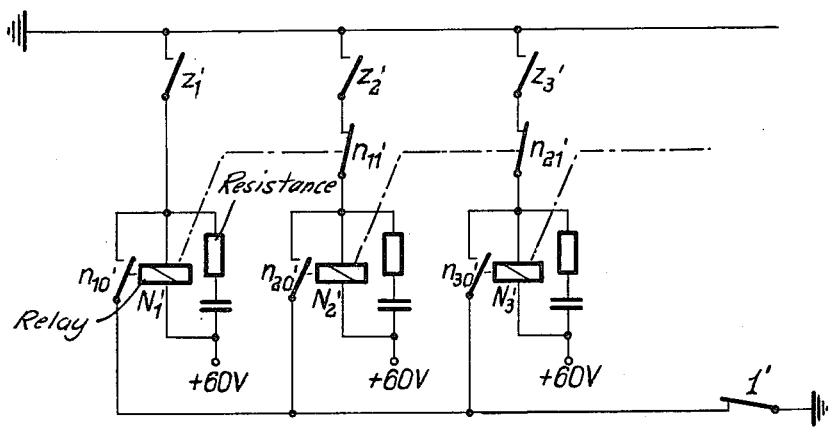
Figure 10:
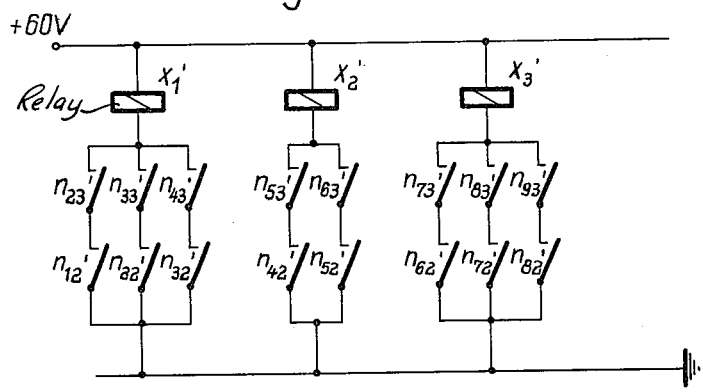
Figure 11:
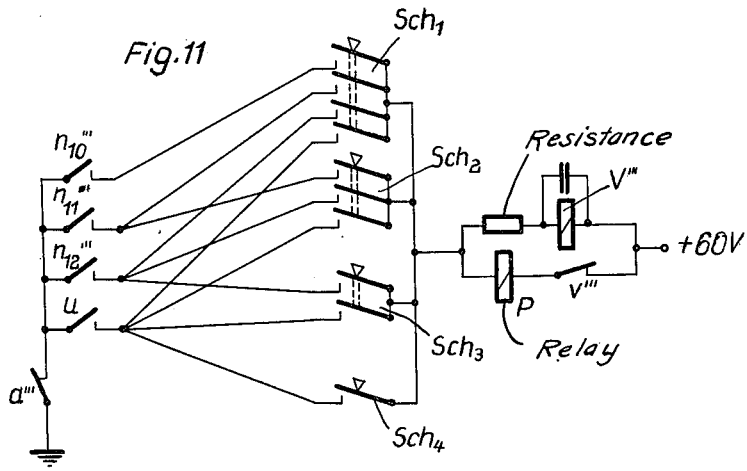
Figure 12:
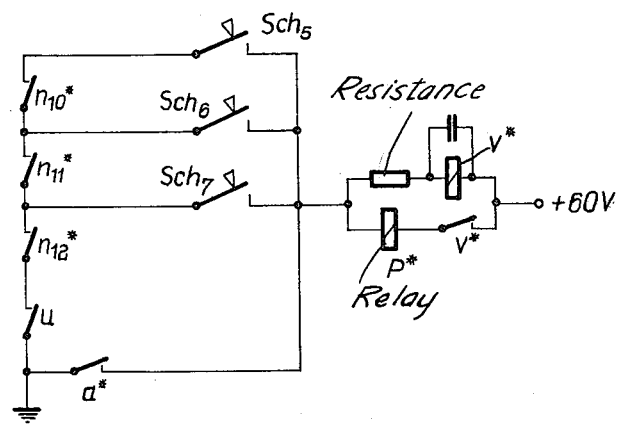
Figure 13:
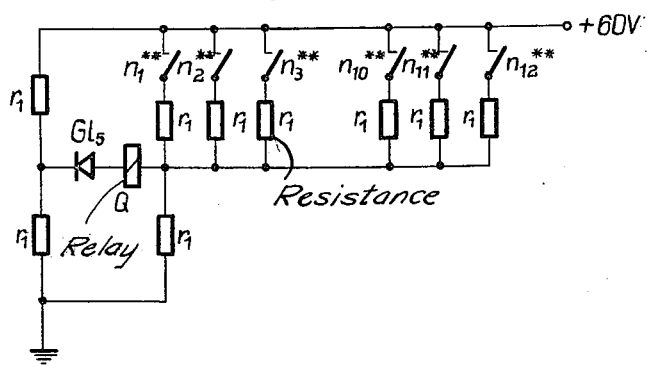

In the drawings:

FIGURE 3 is a pictorial diagram of a Doppler frequency apparatus according to the present invention;

FIGURES 4A, 4B and 4C are schematic diagrams of the speed measuring and indicating features of the apparatus;

FIGURE 5 is a schematic diagram of a circuit for indicating vehicles travelling at velocities above the highest velocity measured by the present apparatus;

FIGURE 6 is a schematic diagram of a circuit for measuring the lengths of passing vehicles;

FIGURE 7 is a schematic diagram of a circuit for indicating and recording vehicle lengths;

FIGURE 8 is a graphical illustration of two vehicles in an antenna pattern;

FIGURES 9 and 10 are schematic diagrams of circuits for eliminating speed measurements for vehicles travelling in one direction on a highway;

FIGURE 11 is a schematic diagram of an auxiliary circuit for tripping a camera;

FIGURE 12 is a modified circuit similar to that of FIGURE 11;

FIGURE 13 is a further modified circuit, similar to that of FIGURE 11, but wherein only the fastest vehicle in a group is photographed.

FIGURE 3 shows the basic principle of the new velocity measuring apparatus which, in this embodiment, operates according to the reflection method. A continuous oscillation fed to a transmitting antenna SA by a transmitter S is radiated by said antenna, reflected by a car K and received by a receiving antenna EA. From the receiving antenna, the energy is fed to a mixer stage M, where the received oscillations, the frequency of which has been shifted with respect to the transmitted frequency, due to the Doppler effect, are mixed with this transmitted frequency S. The difference frequency, i.e., the Doppler frequency, is amplified in a Doppler frequency amplifier DV and is applied to the measuring apparatus.

According to the invention, this measuring apparatus comprises a reed-type tachometer ZM, which is schematically illustrated in FIGURE 3, and which includes a plurality of resonant reeds arranged in operative relation to a winding energized by the Doppler frequency from the amplifier DV. In actual use of an embodiment of a velocity measuring apparatus operating in accordance with the reflection method with electromagnetic waves of 3 cm. length suitable for measuring road vehicle velocities, Doppler oscillations occur in the frequency range between 300 cycles and 1,300 cycles at speeds between 20 and 80 km./hour, which is the velocity range of greatest interest. The upper frequency limit of simple reed-type meters lies at about 1500 cycles/sec. If still higher Doppler frequencies are to be measured, the upper frequency limit can be doubled by superimposing in a manner known per se on the A.C. field of the meter magnet a D.C. field which is greater than the peak value of said A.C. field. In the present embodiment, there are provided fifteen speed measuring devices, each having five reeds, so that velocities down to about 1 km./hour can be accurately indicated, assuming that the bandwidth of the reed amounts to about 2% of its nominal frequency. Satisfactory results can often be obtained at substantially lower expense, because speed measuring apparatus for checking road vehicles are only used to determine whether or not the vehicles are exceeding predetermined speed limits.

According to an advantageous embodiment of the invention, one, or a few, or each of the reeds of the meter serves also as a switch, suitably via relays, to actuate indicators providing steady meter readings. A reed is made into a switch by providing a contact, preferably a resilient wire contact, close to the reed which then forms a contact arm. When the reed vibrates at a predetermined amplitude, it will engage the resilient contact, thus closing a circuit. The amplitude at which a reed switch closes is shown, for example, in FIGURE 2 by a horizontal dotted line. Electric lamps illuminating a velocity-indicating scale may suitably be used as indicators. Velocity indicia may also be applied directly to the bulb of the indicator lamp.

In the following circuits, the relays are denoted by capital letters and their associated contacts are denoted by the same lower-case letters. Also, all of the relay contacts are illustrated in the normally-closed or normally-open position, i.e., with the associated relay winding deenergized, depending on the type of relay.

Circuits for producing a steady indication will now be described with reference to FIGURES 4a, 4b and 4c. FIGURE 4a illustrates the reed switching circuit, FIGURE 4b the lamp indicator circuit, and FIGURE 4c a circuit for erasing indications. In FIGURE 4a, $Z_1$ to $Z_n$ denote the reed switches of the meter. Assuming that the object is moving at a speed which causes the reed $Z_2$ to resonate when this reed switch closes, a holding relay $N_2$ is energized so that the holding contact $n_{21}$ of this relay is closed and the relay $N_2$ is maintained energized by a D.C. voltage of, for example, 12 volts. This circuit will not be interrupted during measuring, because a reset switch 1 remains closed until the next vehicle appears. Operation of the relay $N_2$ causes a normally open contact $n_{22}$, FIGURE 4b, to be closed simultaneously with the contact $n_{21}$, so that an indicator lamp $L_2$ will be connected to a voltage source of, for example, 12 volts. The number 21, appearing on the lamp $L_2$, indicates the speed in km./hour. $L_2$ is illuminated as long as the relay $N_2$ is energized, i.e., it is released only when the next vehicle enters the antenna pattern. To erase the previous reading, there is provided the circuit shown in FIGURE 4c. The indicator relay A (FIGURE 4a), inserted in the reed circuit, is energized when any one of the reeds $Z_1$—$Z_n$ closes with the result, that an erasing contact $a_1$ of the arrangement in FIGURE 4 closes, and the reset relay L is connected to a D.C. voltage of +12 volts via a time delay contact $v$. Operation of the relay L causes the reset contact 1 (FIGURE 4a) to open, so that all of the energized relays N are disconnected and all of the lamps are switched off. The reset relay L must not be energized so long as to prevent a new operation of the relays N. In order to ensure brief energization of the reset relay L, a time delay relay V is arranged in parallel with relay L and contact $v$. Time delay is provided by an RC network, wherein the resistance R is connected in series with relay V, and capacity C is shunted across the relay V. Shortly after the contact $a_1$ is closed, the voltage across the condenser C is increased to a value at which the relay V can operate. This is done with a time delay amounting to about ten cycles of the lowest Doppler frequency. As a result thereof, the contact $v$ is opened and the reset relay L is deenergized. Then, the reset contact 1 (FIGURE 4a) closes again and the apparatus is ready for new speed indications.

In order to save expenses, the upper frequency limit of the reed frequency meter is selected in such a manner that the highest velocity indicated lies between 100 and 120 km./hour. It is of lesser importance to ascertain higher velocities, because all of the speed limits are below this range. In this case, vehicles moving at speeds higher than 100 to 120 km./hour are not indicated. It is the purpose of a further development of the invention, illustrated in FIGURE 5, to indicate vehicles travelling at speeds above the highest velocity indicated by the reed frequency meter.

The Doppler frequency oscillation train is fed to a terminal $K_1$. This train of oscillations causes excitation of the reed frequency meter ZM' and, thereby, excites one or several reeds of the reed frequency meter in accordance with its natural frequency. Two units are in series with the energizing winding of the reed frequency meter, these units each being coupled to the energizing circuit via RC networks. The A.C. voltage appearing at the output of the RC network $R_A$, $C_A$ is rectified by means of two rectifiers or diodes $Gl_1$ and $Gl_2$ and is fed to an indicator relay A'. The RC network is designed in such a manner that the voltage obtained at relay A' is sufficient at all frequencies to energize it. In the system described with reference to the diagram of FIGURE 4a, the indicator relays $N_1$—$N_n$ are provided in the circuit of the reed frequency meter. The insertion of the indicator relay in the energizing circuit of the reed frequency meter, as shown in the diagram of FIGURE 5, has the advantage that this relay is energized independently of the response of the reeds at such times, as a Doppler oscillation train is present. With such kind of operation, the energization of the indicator relay will not be interrupted by vibration of the reed switch. If a system is used in which the frequency ranges of the reeds do not overlap, the Doppler frequency is present even if no reed is energized by this Doppler frequency for a short time.

A rectifier circuit comprising the rectifiers $Gl_3$ and $Gl_4$ is connected to the output of an RC network, the resistance $R_U$ being connected in series with the frequency meter ZM' and the capacity of which is denoted by $C_U$. A resistance $R_U'$ is connected in series with the diode $Gl_4$, and a series circuit of an overspeed relay U and a normally closed contact $s'$ of a blocking relay is across the resistance $R_U'$ and is inserted in the holding circuit of the holding relays N. In the example of FIGURE 4a, the blocking relay is inserted in series with the reset contact 1. If one of the holding relays N responds, the blocking relay in the holding circuit of the holding relays N is energized and the normally closed contact $s'$ will be opened. The voltage appearing at the resistance $R_U'$ cannot energize the overspeed relay. If none of the reeds of the reed frequency meter responds, and if none of the holding relays N is energized, the normally closed contact $s'$ remains closed and the overspeed relay U is energized. A normally closed contact $a_u$ is provided across contact $s'$ and relay U, said contact $a_u$ terminating the energization of the relay U when the relay A' is no longer energized. Since the contact $s'$ remains closed when the velocity of a vehicle is below the lowest of the velocities indicated by the reed frequency meter, the indication of the velocity of such vehicle is prevented by a suitable design of the coupling network $R_U$ and $C_U$, designed in such a way that it acts as a high-pass filter. The cut-off frequency of the high-pass filter is suitably selected in such a manner, that it is in the center of the Doppler frequency occurring. Frequencies above this cut-off frequency pass through almost undamped, so that a voltage appears at the resistance $R_U'$, which voltage generates a current in the overspeed relay when the contact $s'$ is closed, said current being above the threshold current. If the Doppler frequencies are below the cut-off frequency of the filter $R_U$, $C_U$, a lower voltage appears at the resistance $R_U'$, which voltage sets up an energizing current below the threshold current of the overspeed relay U when the switch $s'$ is closed.

The overspeed relay U can be used similarly as the holding relays, as shown in FIGURES 4a and 4b, for controlling the indication, for example, by energizing indicator lamps or energizing a further relay.

The diagram of FIGURE 6 shows a circuit which can be provided with a velocity measuring system according to the invention, wherein the lengths of the passing vehicles are indicated. Such measuring system may be particularly useful for traffic analysis. In such case, it is not only of interest to know how many vehicles are using a highway and at what speeds they are travelling, but it is important to classify the passing vehicles in accordance with their types. This can be accomplished by means of length measuring, because the different types of vehicles, such as motorcycles, passenger cars, trucks, semi-trailers, etc., are substantially distinguished from one another by their lengths.

Starting with the explanation of the lower part of FIGURE 6, $a_1'$ represents a normally open contact belonging to an indicator relay A'. As shown in FIGURE 5, this indicator relay is preferably coupled to the energizing circuit of the reed frequency meter via a rectifier circuit and is energized thereby as long as a vehicle is within the antenna pattern. Thus, when the vehicle enters the antenna pattern, the contact $a_1'$ is closed and, thereby, a reset relay L' is energized via the normally closed contact $v'$. An RC network and a time delay relay V' are shunted across relay L' and contact $v'$, said relay responding upon charging of the condenser, i.e., slightly later than the reset relay L'.

The circuit described in the foregoing corresponds with that shown in FIGURE 4c. The reset relay L' is energized only for a short period of time and causes a brief opening of all of the contacts 1' which are in the circuit acording to FIGURE 6. As a result of this, the information previously set up in the circuit by the switches is cancelled and the system is ready for a new vehicle length after the energization of the reset relay L' is terminated. The normally open contact $1_1'$ is closed for a short time by the brief energization of the reset relay, and a length indicator relay $W_1$ is connected to ground via a resistance $R_1'$ and energized therethrough. After the contact $1_1'$ is opened, the length indicator relay $W_1$ remains energized via the holding contact $w_{11}$ and a resistance $R_2'$. Shunted contacts $n_1''$, $n_2''$, $n_3''$ . . . are associated each with a holding relay, i.e., they are closed if the associated holding relay is energized. If, for example, the normally open contact $n_4''$ is closed, a charging condenser $C_1'$ is charged via the associated resistance $R_4''$, a resistance $R_3'$ and the normally open contact $w_{12}$, which is associated with a relay $W_2$. The charge in the condenser $C_1'$ increases exponentially and, after it has attained a certain value, the length indicating relay $W_2$ is energized. As a result of this, the normally closed contact $w_{23}$ in the energizing circuit of the relay $W_1$ is opened and this relay becomes deenergized. Thereupon, the condenser $C_2'$ is charged via the normally open contact $w_{22}$ which is now closed, a resistance $R_4'$ and the already mentioned resistance $R_4''$. When the charge of this condenser has obtained a certain value, the relay $W_3$ is energized and remains energized via the holding contact $w_{31}$ and the resistance $R_2'$. A normally closed contact $w_{33}$, which is in series with the relay $W_2$, interrupts the energization of the latter. By closing the contacts $w_{32}$, the condenser $C_3'$ is charged via a resistance $R_5'$ and a resistance $R_4''$. If the voltage across the condenser $C_3'$ has obtained a certain final value, the relay $W_4$ will respond, which will be maintained energized via the holding contact $w_{41}$ and the resistance $R_2'$. A normally closed contact $w_{43}$ interrupts the energization of the relay $W_3$. After the vehicle has left the antenna pattern, the contact $a_1'$ is opened, whereby the voltage fed to the condensers is interrupted. The relay $W_4$, which was last energized, remains energized. If the contact $a_1'$ is opened at an earlier time, one of the relays $W_1$, $W_2$ or $W_3$, which was energized last, remains energized. The energization condition of the individual relays is characteristic of the different lengths of the vehicles. Advantageously, the charging time constant is selected as assumed in the example shown in such a manner, that the energization of the relay $W_1$ indicates small vehicles, as for instance, bicycles or motor cycles, the energization of the relay $W_2$ passenger cars, the energization of the relay $W_3$ trucks and busses, and the energization of the relay $W_4$ trucks with trailers. The relay W just sufficiently energized to open the contact $a_2$ remains energized until a new vehicle enters the antenna pattern and energizes the reset relay $L'$.

Contacts $1_2'$, $1_3'$ and $1_4'$ are connected in series with resistances $r_2$, $r_3$ and $r_4$, respectively, and together with the latter are shunted across charging condensers $C_1'$, $C_2'$ and $C_3'$, respectively, whereby these condensers are discharged during the reset step via these resistances. The resistances $R_3'$, $R_4'$ and $R_5'$ prevent intercharging between two condensers which may occur if the contact, for example, $w_{12}$, of the first energized length indicator relay has not opened when the contact, for example, $w_{22}$, of the next succeeding energized length indicator relay closes. In addition, the cancellation time can be adjusted by the resistances $R_3'$, $R_4'$ and $R_5'$, because the remaining load resistance $R_1''$, $R_2''$, $R_3''$, up to $R_n''$, is common for all condensers $C_1'$ to $C_3'$, while the reset time is added only to the charging time for the first condenser $C_1'$. The normally closed contact $w_{43}$ is provided in such a way, that it is simultaneously in the energizing circuit of the relay $W_2$. Tests have shown that, during discharge of the condenser $C_1'$ via the relay $W_2$ and normally closed contact $w_{33}$, the relay $W_2$ may be energized again when the relay $W_4$ is energized, if the contact $w_{33}$ would be directly connected to a switch $1_5'$, as is the case in other analogous switch groups.

The Doppler frequency is changed when a vehicle passes obliquely through the antenna pattern. In order to exactly measure the length of the vehicle, it is recommended that the tests for this length be triggered by the first excitation of the reed frequency meter. This can be accomplished by providing a blocking relay in the holding relay circuit, said blocking relay responding simultaneously with the first energized reed of the meter by connecting a normally open contact of this relay to the circuit of all of the reed switches, i.e., in place of the contact for the relay A in the circuit according to FIGURE 4a. By the provision of this blocking relay, a simultaneous closing of two normally open contacts $n''$ is prevented, which would be possible if the response ranges of the holding relays were not sufficiently different from one another, so that they would overlap.

The diagram of FIGURE 7 shows how the switch condition of the length indicating relays $W_1$ to $W_4$ can be used for indicating the lengths of the vehicles and/or to record them. In the example shown, the vehicles are not only to be recorrded according to their lengths, but they are also to be analyzed according to their velocity. After the vehicle has left the antenna pattern, a normally closed contact $a'$ is opened and on an indicator board carrying recording relays B, one relay B will be energized via one of the normally open contacts $w_{14}$ to $w_{44}$, the associated normally open contact $n$ of which is thus closed. The vehicle leaving the antenna pattern may be assumed, for example, to be a passenger car, so that the contact $w_{24}$ will be closed. Assuming the measured velocity has just the value at which the first velocity relay is energized, the normally open contacts, assigned to this relay, are closed, which contacts bear the first subscript number one, i.e., contacts $n_{11}'$, $n_{12}'$, $n_{13}'$ and $n_{14}'$. Then, the recording relay $B_{12}$ will be energized.

Meter relays known per se are suitably used as recording relays B which, in this circuit arrangement, actuate a counter (not shown) at each energization and move it one step. After the traffic has been recorded, the number of vehicles which have passed can be determined from these recording relays according to vehicle type and velocity. The number of holding relays depends upon the number of different velocities to be recorded, said relays being assigned to the respective velocities and, thereby, the coverage of the system according to FIGURE 7 is given. Consequently, the system according to FIGURE 7 may be enlarged with respect to its coverage by additional recording relays B.

A further development of the system according to the invention will be described in the following with reference to FIGURES 9 and 10. In this embodiment, it is possible to ascertain the direction of the object observed and to eliminate the indication of those objects which travel in one of the two possible directions. This system is based on the fact that the measured Doppler frequency is changed in case of oblique positioning of the antenna with respect to the line of travel, i. e., the change in the direction of frequency shift is dependent upon the direction of travel of the object measured. This phenomenon will be described with reference to FIGURE 8, wherein a road or highway FB is shown on which a vehicle travels in the direction of the arrow FR. An antenna pattern AK of the velocity measuring apparatus covers a portion of the highway. When the vehicle enters this antenna pattern, a beam $St_1$ is reflected on the vehicle while, when the vehicle leaves the antenna pattern, a beam $St_2$ is reflected on the vehicle. FIGURE 8 clearly shows that the relative velocity between the vehicle and the velocity measuring apparatus is smaller for the beam $St_1$ than for the beam $St_2$.

The reed switches in FIGURE 9 are denoted by $z_1'$, $z_2'$, $z_3'$ . . . . One of the terminals of each reed switch is connected to ground, while the other terminal is connected to a D.C. voltage source of, for example, 60 volts, via one of the holding relays $N_1'$, $N_2'$, $N_3'$ . . . . RC networks are shunted across the relays $N_1'$, $N_2'$, $N_3'$, these RC networks being adapted to convert the intermittent current (caused by vibration of the reed switches) to a smooth D.C. current. Holding contacts $n_{10}'$, $n_{20}'$, $n_{30}'$ . . . are shunted across the holding relays, these holding contacts being adapted to be closed upon brief energization of the respective holding relay and, thereby, hold this relay energized via the normally closed contact $1'$. This circuit, in the arrangement described thus far, has already been illustrated in FIGURE 4a. The circuit system in FIGURE 9 includes, in addition thereto, a normally closed contact $n_{11}'$, $n_{21}'$ . . . in each of the circuits of the reed switches $Z_1'$, $Z_2'$, $Z_3'$, respectively, each normally closed contact being assigned to a holding relay inserted in the energizing circuit of the reed switch for the next lower or next higher resonant frequency. In the present example, a contact $n_{11}'$ of the relay $N_1'$ is in series with the reed switch $Z_2'$ and a contact $n_{21}'$ of the relay $N_2'$ is in series with the reed switch $Z_3'$. If an object travels through the antenna pattern in a direction in which the Doppler frequencies increase, two or more successive holding relays can be energized. In case of the reverse direction of travel, only one holding relay will be energized, because the remaining relays are separated from ground by the contact $n_{11}'$ and $n_{21}'$ .... Assuming that $Z_2'$ is the first reed switch excited, the relay $N_2'$ will be energized. Assuming further that, after a short interval, the reed switch $Z_3'$ is closed, the relay $N_3'$ cannot be energized since the relay $N_2'$ was already energized and the contact $n_{21}'$ is opened. If the direction of travel is reversed and if the reed switch $Z_3'$ is first operated, the relay $N_3'$ will be energized first. If the Doppler frequency decreases, the reed switch $Z_2'$ will then be promptly closed.

It is a criterion for the indication of direction that, during passing through the antenna pattern in one direction, only one holding relay is energized and, during passing in the other direction, two or more holding relays are energized. As shown in FIGURE 10, two switch-on contacts of adjacent holding relays are connected in series with each of the direction indicator relays $X_1'$, $X_2'$, $X_3'$ .... The first subscript of the normally open contacts $n'$ corresponds with the subscript of the respective holding relay $N'$. The second subscript refers to the contact designation in the relay. In the embodiment shown in FIGURE 10, several switch pairs are shunted in parallel in the circuit of a relay $X'$. This circuit principally operates also if only one contact pair is arranged in series with the direction indicator relay $X'$. If, for example, the reeds $Z_3'$ and $Z_2'$ are energized one after the other, the normally open contacts $n_{23}'$, $n_{22}'$, $n_{33}'$ and $n_{32}'$ in the energizing circuit of the relay $X_1'$ are closed, whereby this relay is energized via the contacts $n_{22}'$ and $n_{33}'$. If the antenna pattern is passed in the other direction, only the relay $N_2'$ is energized and the normally open contacts $n_{23}'$ and $n_{22}'$ are closed, and the relay $X_1'$ is not energized. Therefore, the relay $X_1'$ can be used to indicate the direction of travel, for example, by providing indicator lamps which are controlled by these relays. In the present embodiment, a suppression of the indication of the velocities of vehicles travelling in the one direction is to be effected rather than an indication of the direction. For this reason, several direction indicator relays $X'$ are provided in the circuit according to FIGURE 10, and holding contacts are associated with these relays which always correspond to a certain velocity range. Thus, the direction indicator relays $X'$ can be directly used for indication of velocity. If, with the direction indication arrangement, vehicles of such direction of travel are to be indicated in which the Doppler frequency increases, normally closed contacts of the next higher holding relay, rather than of the next lower relay, are to be provided in the reed switch circuits of FIGURE 9. A more simple possibility for changing the directional indication of the measurements is to focus the antenna pattern in the desired direction.

This apparatus for indication of the direction of travel operates only if no normally closed contact of a blocking relay is provided in the circuits of the reed switches, this being desirable in the system according to FIGURE 6. If, therefore, instruments for indicating the direction and measuring the length are simultaneously provided in a velocity measuring apparatus, the apparatus has to be equipped with two reed frequency meters.

In the following, two auxiliary devices to be attached to the velocity measuring apparatus, according to the invention, will be described, said devices making it possible to trip photographic cameras when the vehicle exceeds a certain speed limit and the vehicle is at a certain location with respect to the photographic camera. Such devices are particularly useful for traffic police, because they may operate automatic speed control apparatus. Vehicles exceeding the permissible maximum speed will be automatically photographed and the license numbers of the vehicles can be ascertained later by the pictures taken. The cameras are suitably placed at such locations that not only the object to be measured, such as an automobile, but at the same time the respective speed indication of the measuring apparatus is photographed.

FIGURE 11 shows an auxiliary device by which a photographic camera can be tripped when a vehicle enters the antenna pattern or when a vehicle leaves the antenna pattern. Shunted normally open contacts $n_{10}'''$, $n_{11}'''$, $n_{12}'''$ and $u$ are connected to ground via a normally closed contact $a'''$. The function of the latter contact will be explained in the following.

These normally open contacts are assigned to speed indicating relays, i.e., three holding relays and an overspeed relay are assumed. These normally open contacts are connected with four manually operated switches. The other terminals of the switches $Sch_1$ to $Sch_4$ are connected to a D.C. voltage source of, for example, 60 volts, via a camera tripping relay P and a normally closed contact $v'''$. An RC network and a time delay relay $V''''$ are shunted across the tripping relay P and the normally closed contact $v'''$. This last mentioned circuit, including the components P, $v'''$ and $V''''$, was already described with reference to FIGURE 4c. The purpose of these components is to energize the relay P only for a short interval. Due to the delayed charge of the condenser, the time delay relay $V''''$ is energized shortly after energization of the relay P, so that the time delay relay $V''''$ opens the normally closed contact $v'''$ and the energization of the relay P is interrupted. A photographic camera and, if needed, a photo-flasher device may be briefly switched on by the contacts of the relay P. In an apparatus which was in actual use, the energizing time of the relay P was set to 50 m./sec. by a suitable design of the RC network.

It is assumed that the normally open contact $n_{10}'''$ is closed if a vehicle exceeds 60 to 65 km./hour, while a normally open contact $n_{11}'''$ is likewise assigned to the speed between 65 and 70 km./hour, and the normally open contact $n_{12}'''$ is assigned to the speed between 70 and 75 km./hour and the normally open contact $u$ is assigned to all of the higher speeds. If, for example, all of the vehicles are to be photographed, the velocities of which are higher than 60 km./hour, the switch $Sch_1$ has to be closed. If one of the normally open contacts $n_{10}'''$, $n_{11}'''$, $n_{12}'''$ or $u$ is closed, the relay P is shortly energized via the switch $Sch_1$ and is deenergized after a short interval. If, for example, all of the vehicles are to be photographed, the speed of which exceeds 70 km./hour, the switch $Sch_3$ is to be closed, whereby the relay P is energized upon closing of the normally open contact $n_{12}'''$, or the normally open contact $u$. In this case, the camera tripping device will not be actuated by closing of the contacts $n_{10}'''$ and $n_{11}'''$.

As mentioned in the foregoing, the normally closed contact $a'''$ is inserted between ground and the contacts $n'''$ and $u$. This normally closed contact $a'''$ may be replaced by a jumper if the camera tripping device is to be acted upon when a vehicle enters the antenna pattern. If the vehicle is to be photographed from the rear, when the vehicle leaves the antenna pattern, only the normally closed contact $a'''$ is needed. The indicator relay remains energized as long as a train of Doppler frequency oscillations is received. During such period of time, the contact $a'''$ is opened, so that the relay P cannot be energized via closed normally open contacts $n'''$ and u. At the instant when the vehicle leaves the antenna pattern, the energization of the indicator relay ceases, the normally closed contact is closed and, in this moment, the relay P is triggered if the circuit of this relay is closed, because the speed indication remains unchanged until the next object is sighted.

In the above described camera tripping device and the known tripping devices for other speed measuring systems, generally the vehicle is photographed which is the last to leave the antenna pattern in case several vehicles are simultaneously in the range of the apparatus. This takes place whether or not the vehicle has exceeded the speed limit.

It is the purpose of the camera tripping device shown in the example of FIGURES 12 and 13 to be actuated if several vehicles are simultaneously in the antenna pattern of a speed measuring apparatus and if the vehicle which has exceeded the speed limit leaves this antenna pattern, whereby the actuation is independent of whether or not the latter vehicle leaves the antenna pattern first or last in a group of vehicles.

In the circuit of FIGURE 12, a camera releasing relay P* is provided which is shunted across an RC network and a time delay relay V*, the normally closed contact v* being in series with the tripping relay P*. When this relay P* is energized, the camera and if necessary a flasher are tripped. The relay P* remains energized only briefly, i.e., the energization is interrupted by the normally closed contact v* when the time delay relay V* is energized briefly, i.e., for example after 50 m./sec., upon energization of the tripping relay P*. The circuit comprising the components P*, V* and v* and the RC network has been described in the foregoing, and is illustrated in FIGURE 4c. A series circuit comprising normally closed contacts $n_{10}^*$, $n_{11}^*$, $n_{12}^*$ and $u$ is inserted between the circuit described in the foregoing and ground, while a normally closed contact a* is shunted thereacross. The normally closed contacts $n_{10}^*$, $n_{11}^*$ and $n_{12}^*$ are assigned to speed indicating relays, i.e., holding relays. The normally closed contact $u$ is associated with an overspeed relay which is energized when the speed of a vehicle exceeds the highest speed indicated by the reed frequency meter. The normally closed contact a* is assigned to an indicating relay which is energized upon the reception of any train of Doppler frequency oscillations. The different speed limits can be selectively adjusted, for example, by manually operable switches $Sch_5$, $Sch_6$ and $Sch_7$, whereby the relay P* will be energized when these speed limits are exceeded. Prior to a speed measurement, the time delay relay V* is energized via the normally closed contact a* and the normally closed v* is opened, so that the time delay relay P* cannot be energized. It is assumed that the switch $Sch_6$ is closed, so that the camera trip can always take place when vehicles exceed a speed which is equal or higher than the speed indicated by the relay which is associated with the contact $n_{11}^*$.

Assume that two vehicles are in the antenna pattern, of which the first vehicle travels at a speed below the speed limit, while the second vehicle exceeds the speed limit. Since the two vehicles are within the antenna pattern, the normally closed contact a* will be opened. Upon opening of the normally closed contact $n_{12}^*$, the energization of the relay V* is interrupted and the normally closed contact v* is closed. When the second, i.e., the faster vehicle leaves the antenna pattern, the normally closed contact a* closes, whereby P* is energized for a short interval until the energized condition ceases upon energization of the relay V*. However, with the circuit described in the foregoing, it is still not possible to photograph rapidly-travelling vehicles if the first of the two vehicles which are simultaneously in the antenna pattern exceeds the speed limit, while the second vehicle travels with a speed below the speed limit. In this case, the normally closed contact a* would close first, even if the second vehicle has left the antenna pattern, so that the energization of the relay P* would take place too late, with the result that the second vehicle, which has not exceeded the maximum speed, would be photographed. To avoid this disadvantage, a further circuit is provided, whereby the energization of the speed indicating relays is interrupted if the associated reed switch is no longer energized.

Such a circuit is shown in FIGURE 13, comprising a bridge circuit arrangement inserted between ground and a D.C. voltage source of, for example, +60 volts. Three of the bridge branches are formed by equal or approximately equal resistances $r_1$. In one of the branches of the bridge, shunted and equal resistances are provided which are also equal to the resistances in the other of the three bridge branches. These resistances are inserted in the bridge via normally open contacts $n_1^{}$, $n_2^{}$, to for example $n_{12}^{}$. The normally open contacts $n^{}$ are assigned or associated with the relays, for example, holding relays, indicating the speeds. A bridge relay Q and a diode $Gl_3$ connected in series are provided in the neutral branch of the bridge. If two vehicles are simultaneously in the antenna pattern, two speed indicating relays are energized and two contacts $n$ are closed. As a result of this, the balance of the bridge is disturbed and the bridge relay Q will be energized. The normally closed contact of this bridge relay Q is inserted in the holding circuit of the speed indicating relay which is, in the circuit diagram of FIGURE 4a, in series with the normally closed contact 1, so that the energization of all of the speed indicating relay is interrupted, and only those indicating relays remain energized whose respective reeds are likewise energized. The diode $Gl_5$ prevents energization of the bridge relay Q if none of the speed indicating relays is energized and, thereby, none of the resistances $r_1$ is inserted in the fourth bridge branch. Referring again to the circuit shown in FIGURE 12, consider the case that the first of the two vehicles simultaneously in the antenna pattern exceeds the speed limit which is determined by closing of the switch $Sch_6$. When this vehicle enters the antenna pattern, the relays associated with the contact $n_{11}^*$, the contact $n_{12}^*$ or the contact $u$ will be energized, so that one of these contacts will be opened. As explained in the foregoing, with reference to FIGURE 12, the energization of the relay V* will be interrupted because the normally closed contact a* is opened. If, now, the second vehicle, travelling at a lower speed, enters the antenna pattern, a further speed indicating relay will be energized. The balance of the bridge shown in FIGURE 13 will be disturbed and the bridge relay Q will be energized. As a result of the opening of the normally closed contact assigned to the bridge relay Q in the holding circuit, only two of the speed indicating relays are maintained in energized condition, said relays being associated with the reed switches which are still oscillating. If the first vehicle, travelling at the higher speed, leaves the antenna pattern, the speed indicating relay, which was previously maintained in energized condition, becomes immediately deenergized, so that the switches $n_{11}^*$, $n_{12}^*$ or $u$ are closed, depending upon the speed at which this vehicle travelled. As a result of this, the circuit from ground to the camera tripping relay P* is closed via the contacts $u$, $n_{12}^*$, $n_{11}^*$ and the switch $Sch_6$, whereupon this tripping relay P* is briefly energized and, thereby triggers the camera. This triggering occurs even if a second vehicle is still in the antenna pattern and the normally closed contact a* is still open. This new circuit operation is still foolproof if more than two vehicles are simultaneously in the antenna pattern.

I claim:

1. Doppler frequency apparatus for measuring the speeds of objects, comprising transmitting means for propagating waves in an antenna pattern toward a moving object; receiving means for picking up reflected components of said waves; mixing means for comparing the outgoing and reflected waves and delivering a Doppler frequency proportional to the difference in the frequencies of the compared waves; and Doppler frequency indicating means comprising a plurality of separate reeds tuned to vibrate at different natural frequencies each indicative of a different Doppler frequency and calibrated in terms of speeds of the object, exciting means operatively associated with all of the reeds and connected to said mixing means to receive said Doppler frequencies; at least one switch means each having contacts located adjacent and closed by vibration of an associated reed, and indicator means connected with said contacts to indicate closing thereof by vibratory motion of the associated reed.

2. In apparatus according to claim 1, a relay having holding contacts and having a winding connected with and actuated by said contacts when closed by said vibratory motion and said indicator means each being connected with and controlled by an associated holding relay.

3. In apparatus according to claim 2, the holding contacts of each relay being closed by the relay and holding the relay closed without further vibratory motion of the associated reed.

4. In apparatus as claimed in claim 3, an erasing relay connected in the circuit of the switch means and actuated when the contacts of one of said switch means is closed and said erase relay having normally open contacts; a reset relay having normally closed contacts connected in series with said holding contacts; time delay means for limiting the operation of said reset relay to a brief interval after closing of a switch means; and said reset relay being connected in series with said normally open contacts for energization when said erasing relay is actuated by operation of a reed switch.

5. In apparatus according to claim 4, said time delay means comprising a delay relay having normally closed contacts in series with said reset relay and said delay relay having a winding; and an RC time constant connecting said winding in series with the normally open contacts of the erasing relay, the latter time constant delaying opening of the normally closed contacts, whereby the reset relay is actuated for the duration of said time constant when the erasing relay first closes.

6. In apparatus according to claim 2, a circuit for indicating objects travelling faster than the highest speed to which the reeds are responsive, comprising an overspeed relay connected to operating an indicator, a relay connected with said exciting means and having contacts energizing said overspeed relay whenever said exciting means is receiving a Doppler frequency, and disconnecting relay means connected with said holding relay contacts and disconnecting said overspeed relay if a reed vibrates in response to the received Doppler frequency.

7. In apparatus according to claim 6, a high-pass filter network connected between said circuit for indicating objects travelling faster than the speed to which the reeds are responsive and said exciting means.

8. In apparatus according to claim 6, said overspeed relay being a D.C.' relay, and rectifying means connected between said exciting means and said overspeed relay for delivering a rectified component of the Doppler frequency by which the latter relay is operated.

9. In apparatus according to claim 8, said rectifying means being connected in series with a resistance and across said exciting means, and said overspeed relay being connected across said resistance.

10. In apparatus as claimed in claim 1, a source of potential; a plurality of condensers chargeable by a voltage from said source applied during the presence of a Doppler frequency in said exciting means; a relay connected with each condenser and actuated by the charging of the condenser to a predetermined level, each such relay having contacts interposed in the circuit of the next succeeding condenser and having contacts in the circuit of the associated condenser, whereby upon actuation of such relay charging is transferred to the next succeeding condenser from the associated condenser.

11. In apparatus according to claim 10, a resistance connected in series with each of the condensers and the resistances being connected to said source by said switch means actuated by the respective reeds.

12. In apparatus according to claim 10, each relay associated with each condenser having a holding circuit and having normally closed holding circuit contacts connected in the holding circuit of the next preceding relay, whereby only one such relay is energized at a time.

13. In apparatus according to claim 10, holding means associated with each switch means controlling said indicators; reset means for releasing said holding means actuated by the presence of one object in the antenna pattern upon entry of another object therein, shunting means connectable across each condenser for discharging the latter, said shunting means being controlled by said reset means.

14. In apparatus according to claim 13, characterized in that resistances are provided between load resistances and said condensers, said resistances preventing intercharging between two condensers in case of undesired brief simultaneous connections of two condensers and being designed in such a manner, that the time interval necessary for cancelling the previous switching condition, during which the first of the condensers cannot be charged, is compensated by quicker charging of said condenser.

15. In apparatus according to claim 11, for the purpose of avoiding of measuring errors due to change of the Doppler frequencies during passing of an object through the antenna pattern, blocking relay means connected in the holding circuit of the holding relay and having a normally open contact inserted in the circuit of the reed switch, so that only the first energized reed measures the length.

16. In apparatus according to claim 12, counter means for each condenser; a recording relay controlling each counter means; a normally open contact of a holding relay connected in series with each normally open contact of a shunted recording relay, whereby it is possible to classify the objects according to their length and respective velocities.

17. In apparatus according to claim 1, said antenna pattern being disposed at an angle with respect to the direction of travel of said object, whereby the Doppler frequency varies as the object travels therepast, and means for determining the direction of travel of the object comprising a relay actuated by each switching means and having contacts for breaking the circuit in one of the adjacent switching means circuits, and direction indicating relays in said switching means circuits energized when two adjacent switching means circuits are simultaneously energized.

18. In apparatus according to claim 1, wherein for the purpose of suppressing the speed indication of objects travelling in one direction, said switch means comprising normally open contacts for each reed and each contact being connected with a different direction indicating relay, whereby the direction indicating relays initiate the speed indication.

19. In apparatus as claimed in claim 1, a camera; a camera tripping relay; switches selectively connecting said camera tripping relay to at least one of said reed switch means to actuate the relay when the reed is excited; and time delay means interposed between said tripping relay and said switches for disconnecting said tripping relay after actuation.

20. In apparatus according to claim 19, for the purpose of energization of the camera tripping relay at the instant when the object leaves the antenna pattern, an indicating relay having normally closed contacts in series with the shunted normally open contacts, whereby said indicating relay is energized during reception of a Doppler frequency oscillation.

21. In apparatus according to claim 19, for the automatic release of a camera for the purpose of photographing only that one of several objects present in the antenna pattern which exceeds the speed limit, an indicating relay having normally closed contacts connected in shunt with said switching means in the energizing circuit of said camera tripping relay, said indicating relay being energized as long as a Doppler oscillation train is received, a series circuit of normally closed contacts of speed indicating relays energized upon exceeding of the speed limit time delay relay means having normally closed contacts connected in series with said camera releasing relay and opening the energizing circuit thereof after a short interval, and means for terminating the energization of the speed indicating relay at the end of the energization of the respective reeds of said frequency meter.

22. In apparatus as claimed in claim 21, said means for terminating the energization of the speed indicating relay at the end of the energization of the respective reeds of said frequency meter, comprising a bridge circuit, having one branch comprising shunted resistances each having the same value as the other bridge resistances in the other three branches, each of the shunted resistances being connected to the bridge via normally open contacts of the speed indicating relay to which each of the shunted resistances is assigned, and said bridge having a neutral branch comprising the series connection of a bridge relay and of a rectifier wherein said rectifier is polarized in such a way that said bridge relay is energized when one of the shunted resistances is inserted in the bridge, and said bridge relay having normally open contacts connected in the holding circuits of said speed indicating relays.

23. In apparatus according to claim 19, a manually operable switch connected in series with each speed relay for selectively setting the speed to which the apparatus is responsive.

24. In apparatus according to claim 19, said camera tripping relay being connected to energize a flashlight simultaneously with the tripping of the camera.

25. In apparatus according to claim 19, said camera being placed in such a position that the object exceeding the speed limit and the indication on the speed indicating instrument are simultaneously photographed on a single picture.

References Cited in the file of this patent

UNITED STATES PATENTS

| | | |
|---|---|---|
| 2,422,134 | Sanders | June 10, 1947 |
| 2,491,542 | Woodyard | Dec. 20, 1949 |
| 2,629,865 | Barker | Feb. 24, 1953 |